Sept. 20, 1938. P. W. OLSON Re. 20,865

LOCK KEY

Original Filed Feb. 20, 1934

INVENTOR.
Phillip W. Olson
BY
John E. Titus
ATTORNEY.

Reissued Sept. 20, 1938

Re. 20,865

UNITED STATES PATENT OFFICE 20,865

LOCK KEY

Phillip W. Olson, Grand Rapids, Mich., assignor to Automatic Instrument Company, a corporation of Michigan Original No. 2,023,207, dated December 3, 1935, Serial No. 712,239, February 20, 1934. Application for reissue March 15, 1937, Serial No. 130,839½

16 Claims. (Cl. 70—406)

This is a reissue of my Patent No. 2,023,207 of December 3, 1935, for improvements in Lock keys, more particularly for use with a type of lock as shown and described in my co-pending application Serial No. 712,240, filed February 20, 1934.

In keys having deviating grooves in the sides thereof, the grooves have customarily been formed by making a single cut with an end milling tool. Accordingly, to make a key, it was only necessary to locate the unlocking position of the tumbler lugs; then use an end cutter which would cut a groove slightly wider than the diameter of the lugs, for clearance; and mill a groove which would pass through the centers of the lugs.

Objects of this invention are to provide a key which is more difficult to make or reproduce; to provide a key in which the significant tumbler locating surfaces are extremely difficult to ascertain; and in which not only the final position of the tumbler lug must be known, but also the direction in which the tumbler must be moved.

Other objects are to provide a key for operating oppositely movable tumblers which is adapted for being accurately guided longitudinally in the keyway so that the tumblers will be correctly positioned when the key is inserted at a predetermined depth.

Other objects and advantages will become apparent in the following description, taken with reference to the accompanying drawing, in which an illustrative embodiment of the invention is shown.

Figure 1:
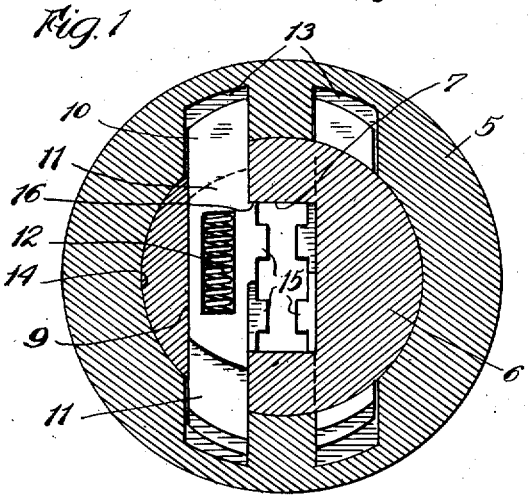
Fig. 1 is a transverse section of a lock barrel having a cylindrical tumbler plug, for illustrating the use of a key of this invention.
Figure 2:
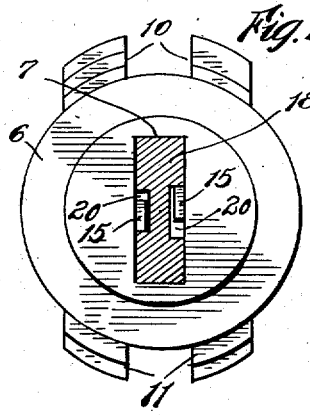
Fig. 2 is an end view of the plug with a key inserted, the key being shown in cross section.
Figure 3:
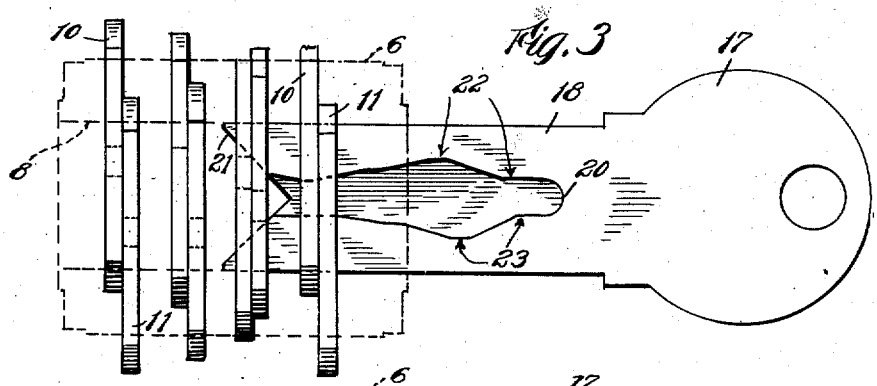
Figure 4:
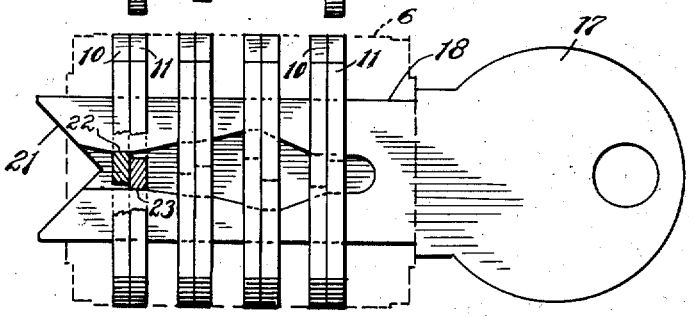

Fig. 3 is a diagrammatic view showing the key being inserted in a lock, the outline of the side elevation of the plug being shown in broken lines, and the set of tumblers which are operated by the groove in one side of the key being shown in full lines in front of the key; and Fig. 4 is a diagrammatic view similar to Fig. 3, with the key fully inserted to withdraw the tumblers completely into the plug.

The lock, which is more fully shown and described in said application, comprises a cylindrical barrel 5 which is to be fixedly mounted in a lock housing; and in the barrel is rotatably mounted a cylindrical tumbler plug 6 which may be connected to the lock bolt in any suitable, well known manner.

The cylinder has a longitudinal keyway 8 extending therethrough, and a plurality of transverse tumbler slots 9 arranged on either or both sides of the keyway. In the slots are slidably mounted tumblers comprising pairs of plates 10 and 11 which have longitudinal apertures in which a spring 12 is placed for pressing the plates outwardly and projecting their ends into locking grooves 13 which extend longitudinally in the walls of the bore 14 of the barrel.

Each plate is provided with a key engaging lug 15 which projects into the keyway, and the outward movement of the plates is limited by shoulders 16, formed on the inner edges thereof, which contact with the top and bottom of the keyway. The length of the plates is such that their ends are flush with the surface of the plug when the plates are completely withdrawn into the plug in unlocking position, and either end will project at the slightest movement from the unlocking position to engage in the grooves 13 and prevent rotation of the plug.

A key 17 is provided which has a rectangular section blade 18 which is closely guided in the keyway 7, and the insertion is limited by shoulders 19, which contact with the face of the plug. In each face of the blade is provided an irregular longitudinal groove 20 for operating the adjacent row of tumblers; and the grooves open into the angle of a V-shaped notch 21 provided in the end of the key, so that, in inserting the key, as shown in Fig. 3, the lugs are drawn together and enter the grooves.

Since the tumbler plates are spring pressed in opposite directions, the lugs will bear against the opposite sides of the groove, and significant surfaces 22 for determining the position of the upwardly pressed plates will be provided in the upper side of the groove, and the surfaces 23, for positioning the downwardly pressed tumblers will occur in the lower side of the groove. Consequently there is no fixed relation between the sides of the groove nor between either side and the center line of the groove.

Accordingly, in making the key, it is necessary to locate surfaces instead of center lines. The surfaces in one side of the groove are determined and a cut is milled to include these surfaces. Then the opposing tumbler locating surfaces are found, and a second cut is made to widen the groove to provide them.

In this manner the difficulty of unauthorized reproduction of a key is increased; and making a key directly from the lock and without a manufacturing chart is only remotely feasible even if it were possible to pick the lock to place all of the lugs in unlocking position.

Having thus described my invention, I claim:

1. A key for a lock having spring pressed tumblers, the key having a flat blade having a groove in one face thereof for receiving cooperative portions of lock tumblers, the opposite sides of the same groove having predetermined unrelated contours for moving some of the tumblers at one side of the key up and others at the same side of the key down into unlocking position.

2. A lock key having a flat blade for filling a keyway, the blade having irregular grooves in the faces thereof and the sides of each groove having predetermined unrelated contours for engaging with projecting portions of oppositely spring pressed tumblers for moving the tumblers upwardly and downwardly for unlocking.

3. A lock key having a flat blade insertable in a keyway, the blade having deviating grooves in the faces thereof and the sides of each groove having predetermined unrelated contours for engagement with the tumblers of the lock.

4. A lock key having a blade adapted to fill and fit a keyway, the blade having deviating grooves in the faces thereof, the sides of each groove having unrelated contours for positioning transversely movable tumblers in opposite directions.

5. A key for a lock having transversely movable tumblers spring pressed in opposite directions, the key having a blade which is longitudinally insertable in the lock and has deviating grooves in the faces thereof, the sides of each groove having predetermined unrelated contours for cooperating with the tumblers and positioning the same for unlocking.

6. A key for a lock having a row of tumblers having projecting lugs and laterally movable in opposite directions for unlocking, the key being insertable in the lock to a predetermined depth and having a longitudinal irregular groove for receiving the lugs of the tumblers, the surfaces for positioning the tumblers which are movable in one direction being provided in one of the sides of the groove, and independently contoured surfaces for positioning the oppositely movable tumblers being provided in the opposite side of the same groove.

7. A key for a lock having pairs of adjacent transversely movable tumblers spring-pressed in opposite directions, the key having a blade longitudinally insertable in the lock with grooves in the faces thereof, the sides of each groove having independent contours for positioning the adjacent movable tumblers in opposite directions.

8. A key for a lock having transverse slots and a pair of transversely movable spring-pressed tumblers in each slot, the key having a blade insertable in the lock with grooves in the faces thereof for receiving the lugs of the tumblers, and the sides of each groove having independent contours for positioning the transversely movable tumblers of each pair in opposite directions.

9. A key having a deviating longitudinal groove in both sides thereof for operating lock tumblers which have lugs projecting into the keyway from opposite sides and movable in one direction or the other from the same groove for unlocking, the sides of each groove being of independently and differently formed unrelated contour.

10. A key according to claim 9 in which each tumbler has an individual spring and a pin engaged by the spring and variable in location so that any tumbler may be moved from unlocking in either direction from one groove, the key surface on the upper or lower part of the groove on each side of the key being unrelated and operative to press a corresponding tumbler against its spring.

11. A key having an irregular lateral groove for operating lock tumblers arranged along the sides of the keyway and having lugs projecting into the keyway for engaging in said groove and movable in either direction from the same groove for unlocking, the two sides of the groove being of independent and different unrelated conformation but spaced apart a distance greater than the thickness of the tumbler lugs so that the tumbler releasing surfaces thereof cannot be easily determined by one attempting to pick the lock or duplicate the key.

12. A key having longitudinal grooves on both sides for operating lock tumblers on both sides of the key and movable in either direction from the same groove with lugs projecting into the key grooves and the tumblers separately spring pressed, the key grooves being independently formed with locating surfaces on one side of each groove for positioning the tumblers which are movable in one direction, and the locating surfaces provided in the opposite side of each groove for positioning the other tumblers at that side, the locating surfaces at opposite sides of each groove being independent and unrelated.

13. A key having a deviating tumbler lug engaging groove in each side thereof, locating surfaces for a portion of the tumblers at one side of the key being provided in one side of each groove and locating surfaces for the remaining tumblers at that side of the key being provided in the opposite side of the same groove, the sides of the grooves being unrelated so that the contours of all four sides of the two grooves are of independent formation.

14. A key having a deviating tumbler lug engaging groove in each side thereof, releasing surfaces for a portion of the tumblers movable in one direction at one side of the key being provided in one side of each groove and releasing surfaces for the remaining tumblers movable in the opposite direction at that side of the key being provided in the opposite side of the same groove, and the sides of the grooves being unrelated so that the contours of all four sides of the two grooves are of independent formation.

15. A key according to claim 14 in which the groove at each side of the key is wider than the tumbler lugs adjacent some of the tumbler releasing surfaces of the groove so that each tumbler is independently operated by one of the surfaces.

16. A key for a tumbler lock having oppositely moving tumblers at each side of the keyway with lugs projecting into the keyway, the key having grooves in opposite sides for engaging lugs, the grooves having unrelated side surfaces for independently moving four series of tumblers in opposite directions, two at each side of the keyway.

PHILLIP W. OLSON.